(12) United States Patent
McLaughlin et al.

(10) Patent No.: US 11,945,568 B2
(45) Date of Patent: Apr. 2, 2024

(54) HYBRID PRESSURE DECK FOR AIRCRAFT

(71) Applicant: The Boeing Company, Chicago, IL (US)

(72) Inventors: Mark R. McLaughlin, Snohomish, WA (US); David H. Leibov, Seattle, WA (US)

(73) Assignee: The Boeing Company, Chicago, IL (US)

(*) Notice: Subject to any disclaimer, the term of this patent is extended or adjusted under 35 U.S.C. 154(b) by 105 days.

(21) Appl. No.: 17/570,288

(22) Filed: Jan. 6, 2022

(65) Prior Publication Data

US 2022/0274682 A1   Sep. 1, 2022

Related U.S. Application Data

(60) Provisional application No. 63/155,027, filed on Mar. 1, 2021.

(51) Int. Cl.
*B64C 1/18* (2006.01)

(52) U.S. Cl.
CPC ..................... *B64C 1/18* (2013.01)

(58) Field of Classification Search
CPC .... B64C 1/26; B64C 1/18; B64C 1/20; B64C 1/061; B64C 1/064; B64C 1/10
See application file for complete search history.

(56) References Cited

U.S. PATENT DOCUMENTS

| | | | |
|---|---|---|---|
| 8,177,167 B2* | 5/2012 | Meyer | B64C 1/26 244/119 |
| 8,672,268 B2* | 3/2014 | Guillemaut | B64C 1/26 244/119 |
| 8,740,151 B1* | 6/2014 | Rosman | B64C 1/065 244/119 |
| 10,399,663 B2* | 9/2019 | Soula | B64C 1/06 |

(Continued)

FOREIGN PATENT DOCUMENTS

| | | | |
|---|---|---|---|
| CA | 2798046 A1 * | 6/2013 | B64C 1/10 |
| EP | 3838741 A1 | 6/2021 | |
| FR | 2913400 A1 | 9/2008 | |

OTHER PUBLICATIONS

European Search Report; Application EP22151598; dated Jun. 13, 2022.

(Continued)

*Primary Examiner* — Joshua J Michener
*Assistant Examiner* — Ryan Andrew Yankey
(74) *Attorney, Agent, or Firm* — Duft & Bornsen, PC

(57) ABSTRACT

Embodiments for hybrid pressure deck of an aircraft. One embodiment is a pressure deck disposed over a main gear wheel well of an aircraft. The pressure deck includes longitudinal beams extending in a forward and aft direction between an aft wheel well bulkhead and a rear spar of the aircraft. The pressure deck also includes a web attached to an underside of the longitudinal beams. The web includes a flat web portion supported by transverse stiffeners extending in an inboard and outboard direction, and a curved web (Continued)

portion including arches configured to flex laterally from load in the inboard and outboard direction. A transition between the flat web portion and the curved web portion extends at least partially in the forward and aft direction of the aircraft.

10 Claims, 5 Drawing Sheets

(56) References Cited

U.S. PATENT DOCUMENTS

| | | | | |
|---|---|---|---|---|
| 10,871,232 B2* | 12/2020 | Laverne | | B64C 3/26 |
| 11,235,850 B2* | 2/2022 | McLaughlin | | B64C 1/06 |
| 11,292,573 B2* | 4/2022 | Hesslewood | | B64C 1/18 |
| 11,298,892 B2* | 4/2022 | Santiago | | B29C 43/10 |
| 11,358,699 B2* | 6/2022 | Leibov | | B64C 1/18 |
| 11,548,607 B2* | 1/2023 | McLaughlin | | B64C 1/069 |
| 11,634,207 B2* | 4/2023 | McLaughlin | | B64C 1/061 |
| | | | | 244/131 |
| 2009/0137196 A1* | 5/2009 | Klug | | B64C 1/10 |
| | | | | 454/71 |
| 2013/0344291 A1* | 12/2013 | Pearson | | B29D 99/0005 |
| | | | | 156/212 |
| 2016/0185451 A1* | 6/2016 | Bellet | | B64C 1/18 |
| | | | | 244/129.1 |
| 2019/0112034 A1* | 4/2019 | Bellet | | B64C 25/16 |
| 2019/0112035 A1* | 4/2019 | Bellet | | B64C 25/04 |
| 2020/0189713 A1* | 6/2020 | Murphy | | B64C 3/182 |
| 2021/0171182 A1* | 6/2021 | McLaughlin | | B64C 1/065 |
| 2021/0179249 A1* | 6/2021 | McLaughlin | | B64C 1/069 |
| 2021/0179250 A1* | 6/2021 | Vukosav | | B64C 1/069 |
| 2022/0033051 A1* | 2/2022 | McLaughlin | | B64C 1/061 |
| 2022/0126985 A1* | 4/2022 | Bellet | | B64C 1/10 |
| 2022/0234714 A1* | 7/2022 | Skilton | | B64F 5/10 |
| 2022/0289365 A1* | 9/2022 | Orteu | | B64C 25/10 |
| 2022/0315200 A1* | 10/2022 | Orteu | | B64C 25/04 |
| 2023/0139014 A1* | 5/2023 | Blom-Schieber | | B64C 1/061 |
| | | | | 244/119 |
| 2023/0148389 A1* | 5/2023 | Orteu | | B64C 25/04 |
| | | | | 244/102 R |

OTHER PUBLICATIONS

European Office action; Application 22151598.4; dated Nov. 8, 2023.

* cited by examiner

HYBRID PRESSURE DECK FOR AIRCRAFT

RELATED APPLICATIONS

This non-provisional patent application claims priority to U.S. Provisional Patent Application No. 63/155,027 filed on Mar. 1, 2021, which is incorporated by reference as if fully provided herein.

FIELD

This disclosure relates to the field of aircraft and, in particular, to a pressure deck of an aircraft.

BACKGROUND

Large aircraft have a pressure deck in the fuselage located near where the wings attach to the fuselage. The pressure deck separates the pressurized cabin from the unpressurized main gear wheel well, and transfers the weight of cargo and/or passengers to the main structures of the fuselage and wings. A pressure deck for a freighter variant of an aircraft is typically different than that of a passenger aircraft due to the additional support and load paths required for a freighter floor. However, providing additional structural support may impede the structural flexibility of the pressure deck, and it is advantageous to maintain structural flexibility to enable the aircraft to carry heavy loads with relatively lighter material.

SUMMARY

Embodiments described herein provide a hybrid pressure deck for an aircraft. The pressure deck includes a web that provides a pressure barrier between the cabin and main wheel well gear of the aircraft, and also provides a desirable combination of stiffened structure and flexible structure to optimize wing flexibility and cargo carrying capability for the aircraft. In particular, the web includes a stiffened web portion and a flexible web portion, sometimes referred to herein as a curved or catenary web. A line of transition between the stiffened web and flexible web extends in a forward/aft direction or at a diagonal thereto, and the location of this transition provides several technical benefits. Advantages include reduced deformation mismatches at the intersection of the pressure deck and rear spar, increased lateral stiffness at other areas of the pressure deck to improve freighter side loading and resolve catenary reversal behavior under lateral loads, increased space for routing aircraft systems, improved integration of web along with reduced assembly time, and reduced compression at the aft wheel well bulkhead.

One embodiment is a pressure deck disposed over a main gear wheel well of an aircraft. The pressure deck includes longitudinal beams extending in a forward and aft direction between an aft wheel well bulkhead and a rear spar of the aircraft. The pressure deck also includes a web attached to an underside of the longitudinal beams. The web includes a flat web portion supported by transverse stiffeners extending in an inboard and outboard direction, and a curved web portion including arches configured to flex laterally from load in the inboard and outboard direction. A transition between the flat web portion and the curved web portion extends at least partially in the forward and aft direction of the aircraft.

Another embodiment is a pressure deck disposed over a main gear wheel well of an aircraft. The pressure deck includes longitudinal beams extending in a forward and aft direction between an aft wheel well bulkhead and a rear spar of the aircraft. The longitudinal beams are spaced from each other in an inboard and outboard direction between wheel well longeron beams at either side of body of the aircraft to form a middle bay, intermediate bays, and outboard bays. The pressure deck also includes a web attached to an underside of the longitudinal beams and the wheel well longeron beams. The web includes a flat web portion supported by transverse stiffeners extending an inboard and outboard direction, and a curved web portion including arches configured to flex laterally under load in the inboard and outboard direction. The flat web portion is disposed at the middle bay and the intermediate bays, and the curved web portion is disposed at the outboard bays.

Yet another embodiment is a pressure deck disposed over a main gear wheel well of an aircraft. The pressure deck includes longitudinal beams extending in a forward and aft direction between an aft wheel well bulkhead and a rear spar of the aircraft. The longitudinal beams are spaced from each other in an inboard and outboard direction between wheel well longeron beams at either side of body of the aircraft to form a middle bay, intermediate bays, and outboard bays. The pressure deck also includes a web attached to an underside of the longitudinal beams and the wheel well longeron beams. The web includes a flat web portion supported by transverse stiffeners extending an inboard and outboard direction, and a curved web portion including arches configured to flex laterally under load in the inboard and outboard direction. The flat web portion is disposed in the middle bay and the outboard bays to react side loads. A combination of the flat web portion and the curved web portion is disposed in the intermediate bays to provide flexibility at an intersection of the rear spar and the pressure deck.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific example embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
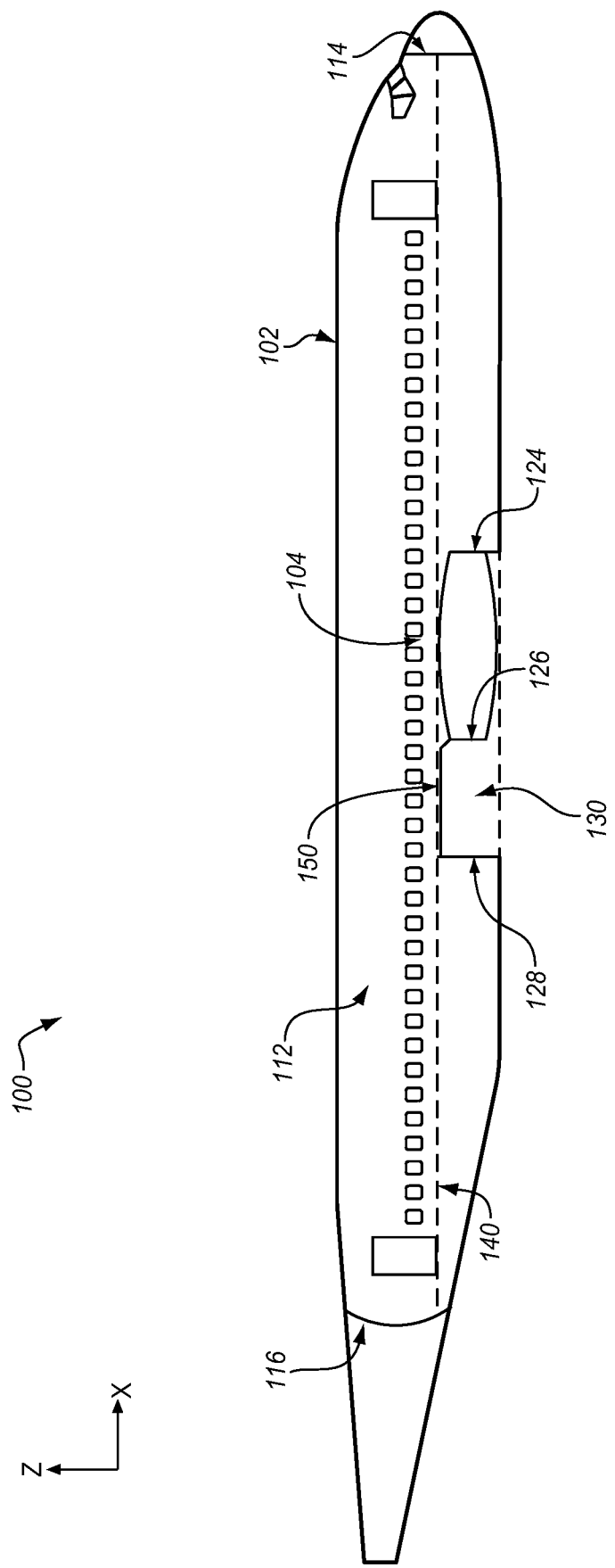
FIG. 1 is a side view of an aircraft.

FIG. 1 is a side view of an aircraft 100. The aircraft includes a fuselage 102 and wings coupled thereto at a wing center section 104 that includes a front spar 124 and rear spar 126. The fuselage 102 includes a cabin 112 that maintains a pressurized environment for altitudes and which is sealed by bulkheads including a forward pressure bulkhead 114 and an aft pressure bulkhead 116.

The aircraft 100 also includes a pressure deck 150 disposed between the cabin 112 and the main gear wheel well 130 (e.g., in a vertical Z-direction). The pressure deck 150 extends longitudinally (e.g., in the X-direction) between the rear spar 126 and an aft wheel well bulkhead 128 of the aircraft 100. The pressure deck 150 forms a portion of a floor 140 of the cabin 112 to seal the cabin 112 and support aircraft loads including passengers and/or cargo. Additionally, the pressure deck 150 includes structure that defines the fuselage/wing interaction. Generally, structural flexibility within the pressure deck 150 allows it to flex with the wings and react loads with a relatively lighter architecture. While inboard/outboard flexibility of the pressure deck 150 is suitable for passenger aircraft, freighter aircraft designs call for more structural rigidity/strength in the floor 140 to stabilize cargo (e.g., containers, pallets, etc.). Unfortunately, existing techniques for strengthening the pressure deck 150 for cargo tend to counteract its structural flexibility and associated benefits.

Figure 2:
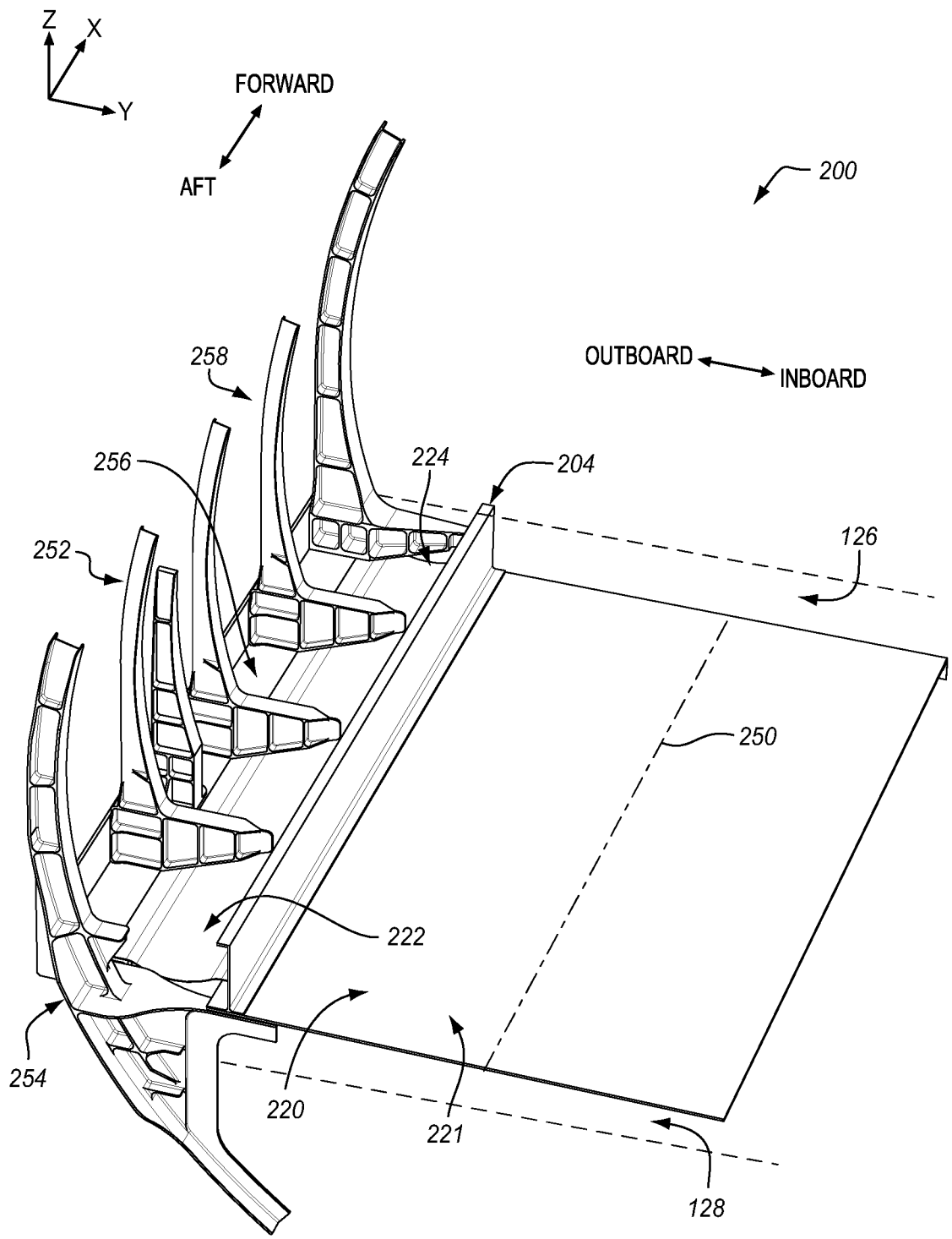
FIG. 2 is a perspective view of a pressure deck in an illustrative embodiment.
Figure 3:
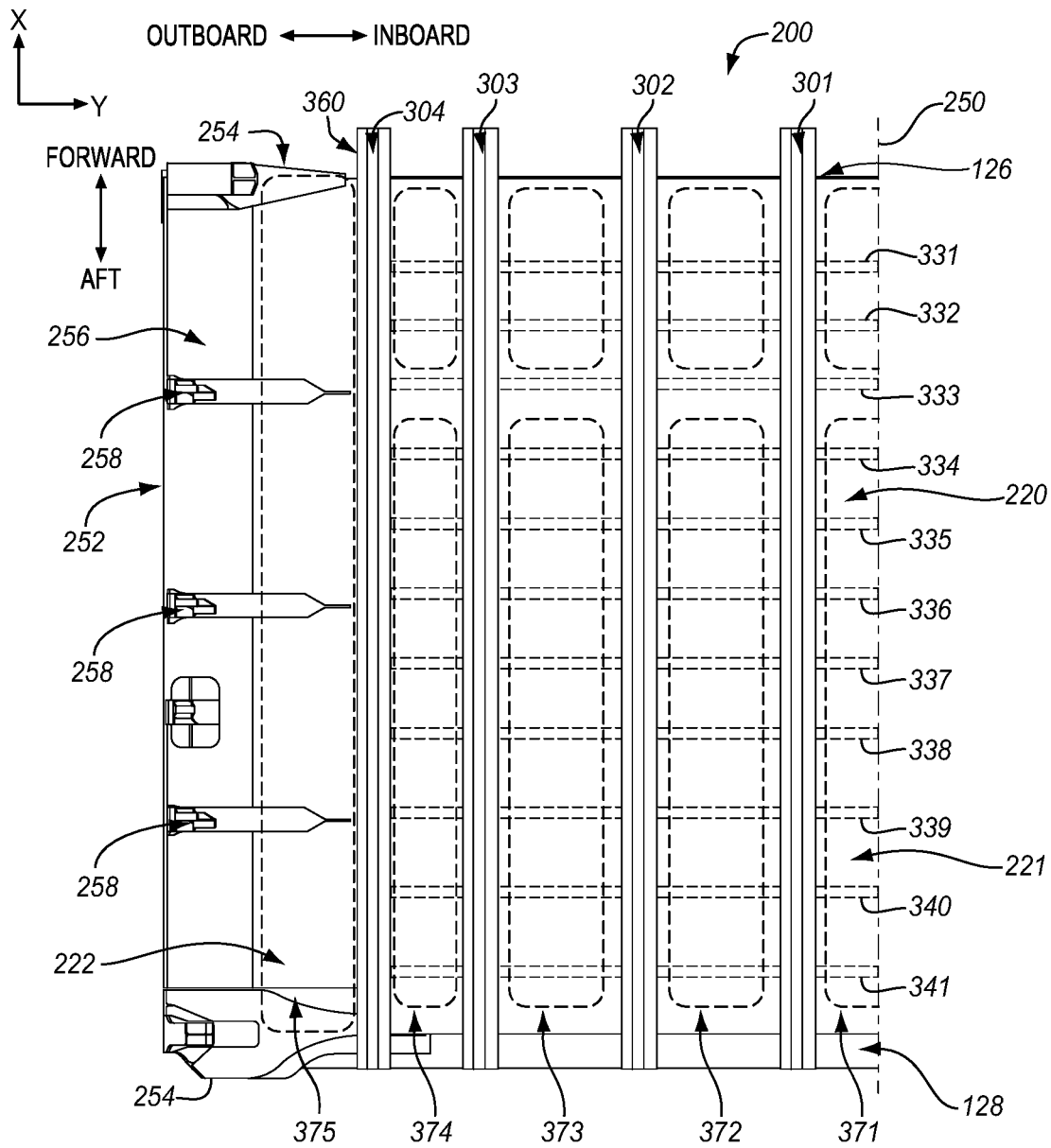
FIG. 3 is a top view of the pressure deck in an illustrative embodiment.
Figure 4:
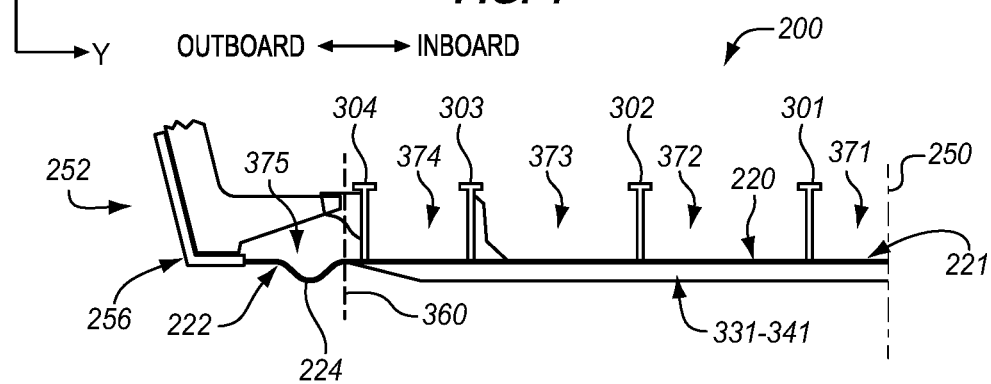
FIG. 4 is a horizontal view of the pressure deck as viewed looking forward in an illustrative embodiment.

FIG. 2 is a perspective view of a pressure deck 200 in an illustrative embodiment. FIG. 3 is a top view of the pressure deck 200 in an illustrative embodiment. FIG. 4 is a horizontal view of the pressure deck 200 as viewed looking forward in an illustrative embodiment. FIGS. 2-4 show a left half of the pressure deck 200 (and aircraft) from a center line 250 to a side of body 252 for ease of illustration. Accordingly, components of the pressure deck 200 and aircraft may be mirrored at left/right sides and description of the left side similarly applies to a right side (not shown). The pressure deck 200 is generally disposed over a main gear wheel well 130 and provides a pressure barrier for the cabin 112. The pressure deck 200 may therefore extend in a forward/aft direction between the rear spar 126 and the aft wheel well bulkhead 128, and in an inboard/outboard direction between either side of body 252 (i.e., left/right sides) of the aircraft. Each side of body 252 includes one or more side fittings 254 and one or more fuselage frames 258. For example, side fittings 254 may include fittings at the rear spar 126 and the aft wheel well bulkhead 128 with multiple fuselage frames 258 spaced therebetween. Though sometimes described with respect to the aircraft 100 of FIG. 1, embodiments of a pressure deck described herein may be installed in alternative aircraft and may apply to both passenger and cargo variants of an aircraft.

With reference first to FIG. 2, which shows a pared down version of the pressure deck 200 for clarity, the pressure deck 200 is enhanced with a web 220 that provides a desirable combination of stiffened structure and flexible structure to optimize wing flexibility and cargo carrying capability. The web 220 generally includes a sheet-like structure forming a bottom of the pressure deck 200. Thus, the web 220 may extend forward/aft from the rear spar 126 to the aft wheel well bulkhead 128 and inboard/outboard between the wheel well longeron beam 256 at either side to provide a pressure barrier between the cabin and external environment of the aircraft.

The web 220 includes a flat web portion 221 and a curved web portion 222. The flat web portion 221 provides lateral stiffness and load path to react cargo loads, and the curved web portion 222 enables a flexible and compatible wing-fuselage interaction where the pressure deck 200 meets the rear spar 126. Unlike the flat web portion 221 which forms a flat sheet structure, the curved web portion 222 forms a sheet structure that includes an arch 224, or downward facing curve, between two adjacent beams (see also, for example, FIG. 4). The arch 224 flexes from wing induced deflections in an accordion-like fashion and thus provides flexibility for compliance of the pressure deck 200 at the rear spar 126. The curved web portion 222 thus advantageously reduces deformation mismatches at the intersection of the pressure deck 200 and rear spar 126.

In one embodiment, the curved web portion 222 and arch 224 extend between an outboard beam 204 to the wheel well longeron beam 256 at the side of body 252 of the aircraft. Furthermore, the flat web portion 221 is disposed between left/right curved web portions 222 (or between left/right outboard beams 204). Therefore, curved web portions 222 are disposed outboard from the flat web portion 221 at both sides. In this configuration, the curved web portion 222 provides a smooth displacement curve of the fuselage side of body 252 over the transition from the wing to the pressure deck 200. Further technical benefits of the location and configuration of the flat web portion 221 and the curved web portion 222 are described below.

Referring now to FIGS. 3-4, the pressure deck 200 includes longitudinal beams 301-304 extending between the rear spar 126 and the aft wheel well bulkhead 128 in a forward/aft direction (e.g., an X-direction or along a fuselage of the aircraft). The longitudinal beams 301-304 may support a cargo restraint system configured to load/support cargo for a freighter aircraft. For example, the pressure deck 200 may support tracks and/or side locks disposed along the beams 301-304 to transport and restrain cargo in the aircraft. The longitudinal beams 301-304 thus transmit floor loads to the main structure of the aircraft including the rear spar 126 and aft wheel well bulkhead 128.

The longitudinal beams 301-304 are spaced from one another in a lateral direction (e.g., Y-direction or inboard/outboard direction) and are between and parallel with wheel well longeron beams 256 at either side of body of the aircraft. Accordingly, the wheel well longeron beams 256 and the longitudinal beams 301-304 form bays 371-375 including a middle bay 371, intermediate bays 372-374, and outboard bays 375. Each bay 371-375 includes a channel or space extending longitudinally between adjacent beams (e.g., U-shaped channels, extending forward/aft from the aft wheel well bulkhead 128 to the rear spar 126). In one embodiment, four longitudinal beams 301-304 are disposed between the center line 250 and the left fuselage frame 258 and four longitudinal beams 301-304 are disposed between the center line 250 and the right fuselage frame (not shown). An outboard beam 304 that is most outboard among the longitudinal beams 301-304 is similar to the outboard beam 204 of FIG. 2 previously described.

The web 220 is attached to an underside of longitudinal beams 301-304. The web 220 is also attached to an underside of the wheel well longeron beams 256 at either side of body 252 of the aircraft. As shown in FIGS. 3-4, the web 220 includes a transition 360 between the flat web portion 221 and the curved web portion 222 that delineates a change in the web structure. The transition 360 extends at least partially in the forward and aft direction of the aircraft. In this embodiment, the transition 360 is parallel with the forward and aft direction and located approximately along the outboard beam 304 at each side and/or slightly outboard of the outboard beam 304 at each side. Thus, the transition 360 divides the flat web portion 221 and the curved web portion 222 such that the flat web portion 221 is situated between the outboard longitudinal beams 304 at the left/right sides (right side not shown), and the curved web portion 222 and the arch 224 are situated between the outermost longitudinal beam (e.g., outboard beam 304) and the wheel well longeron beam 256 at either side. Put another way, the curved web portion 222 is disposed at outboard bays 375 (e.g., at each left/right side), and the flat web portion 221 is disposed at the other bays including a middle bay 371 and intermediate bays 372-374.

The flat web portion 221 is supported by transverse stiffeners 331-341 to provide lateral stiffness and load path for reacting aircraft loads. The transverse stiffeners 331-341 extend laterally in an inboard/outboard direction (e.g., Y-direction or across the fuselage of the aircraft) and are spaced from one another in a longitudinal direction (e.g., X-direction). The support of the transverse stiffeners 331-341 enable the flat web portion 221 to provide increased lateral support as compared to a full catenary pressure deck. For example, a full catenary pressure deck, which may include an arch in the web between each longitudinal beam, provides no local lateral compression capability (except at center/outboard bays) and therefore lateral load is reacted at the aft wheel well bulkhead 128 which may be designed with increased support and weight to handle the compression/tension loading. Additionally, a full catenary pressure deck may be subject to so-called catenary reversal behavior in which a curved panel of the web is deformed by freighter load in such a way that its structural strength is compromised. By contrast, the pressure deck 200 which includes the flat web portion 221 supported by the transverse stiffeners 331-341 reduces compression loading at the aft wheel well bulkhead 128 to avoid added structure and weight while providing sufficient structure for freighter side loading to resolve catenary reversal behavior. In some embodiments, and as shown in FIGS. 2-3, the curved web portion 222 extends longitudinally the full length of the outboard bay 375 from the aft wheel well bulkhead 128 to the rear spar 126. However, in alternative embodiments, an aft portion of the outboard bay 375 may include the flat web portion 221 for to increase support for the aft wheel well bulkhead 128 as desired.

As perhaps best illustrated in FIG. 4, the transverse stiffeners 331-341 are disposed underneath the flat web portion 221 to provide lateral load support without interrupting the space, or bays 371-375, between the longitudinal beams 301-304 to increase space for routing cables and installing aircraft systems. Therefore, as compared with a full catenary web configuration which may rely on intercostals installed between adjacent beams for lateral support but which can obstruct routing paths, the flat web portion 221 advantageously strengthens lateral support in the pressure deck 200 while providing ample space for aircraft systems. For example, in this embodiment, the flat web portion 221 is disposed at the middle bay 371 and intermediate bays 372-374 to form open space, or U-shaped channels, extending longitudinally from the aft wheel well bulkhead 128 to the rear spar 126 between adjacent ones of the longitudinal beams 301-304. In FIG. 3, the bays 371-375 are outlined by dashed lines and each bay 371-375 is shown segmented, though it will be appreciated that each bay 371-375 may include a single unsegmented space from the aft wheel well bulkhead 128 to the rear spar 126. Furthermore, the pressure deck 200 may alternatively or additionally include a beaded geometry to provide lateral stiffness.

In one embodiment, the flat web portion 221 is co-cured with the transverse stiffeners 231-241. Integrally co-curing the flat web portion 221 with the transverse stiffeners 231-241 advantageously reduces assembly time since it involves less drilling and assembly as compared to other pressure decks supported with intercostals. Additionally, previous pressure decks with full catenary webs may involve the use of multiple rows of fasteners to attach the web to beams as well as complicated curved attachment interfaces at the aft wheel well bulkhead 128 and other areas of the pressure deck 200. By contrast, the flat web portion 221 simplifies the attachment interfaces and can be installed using fewer fasteners due its flat shape to reduce assembly time and installation cost of the pressure deck 200. The flat shape of the flat web portion 221 enables a one-piece, or monolithic, construction that can use fewer fasteners as there are no internal edges at the longitudinal beams 301-304. Alternatively or additionally, the transverse stiffeners 231-241 may be bolted or bonded with the flat web portion 221. The configuration of the web 220 including the location of the flat web portion 221 and the curved web portion 222 thus provides several technical benefits in installing the pressure deck 200 with an aircraft while providing a desirable combination of support and flexibility. Furthermore, as described in greater detail below, the web 220 enables compliance between the pressure deck 200 and the rear spar 126 for wing induced flexibility while still reacting pressure.

Figure 5:
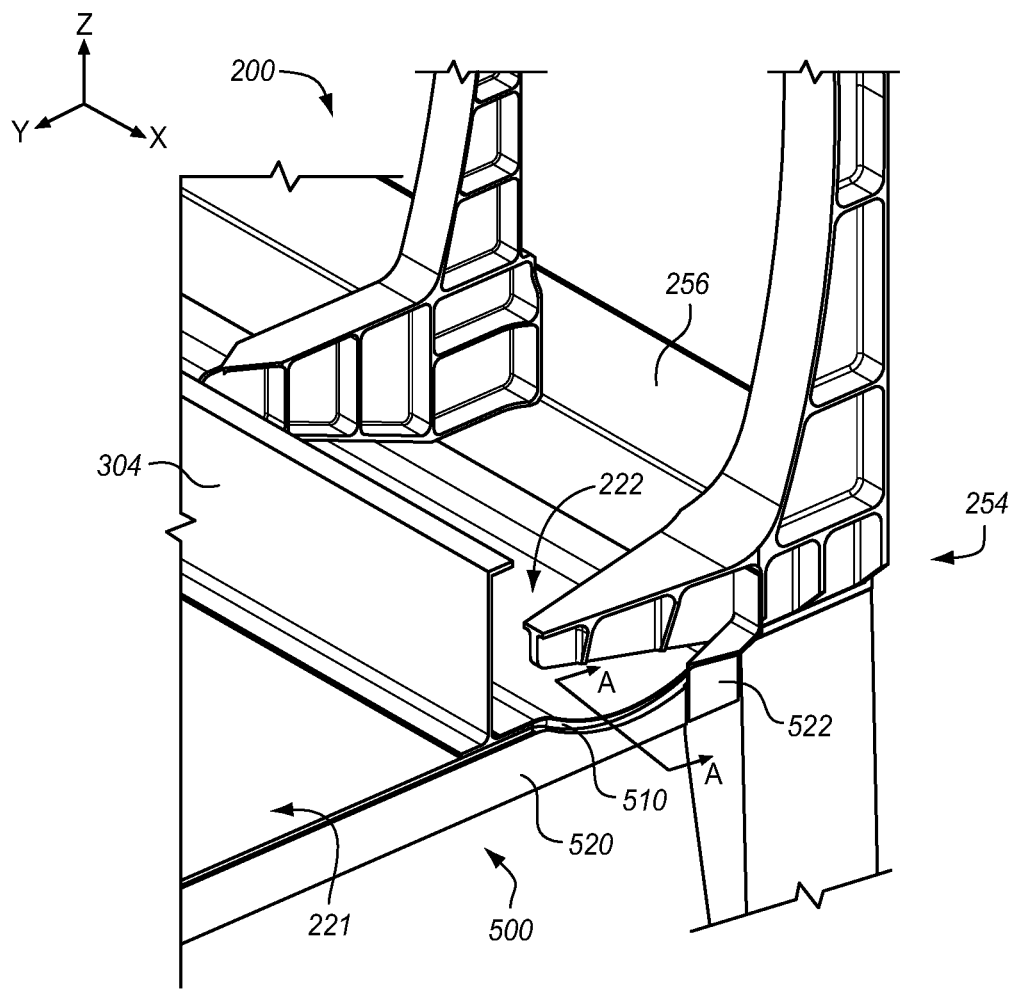
FIG. 5 is a close-up perspective view of a rear spar area of the pressure deck in an illustrative embodiment.

FIG. 5 is a close-up perspective view of a rear spar area 500 of the pressure deck 200 in an illustrative embodiment. FIG. 5 shows the pressure deck 200 includes a seal 510 disposed between the curved web portion 222 and rear spar (not shown for clarity). The curved web portion 222 is configured to flex from induced loading of a wing to prevent transmission of the induced loading to other areas of the pressure deck 200, and to compress the seal 510 to maintain a pressure barrier between a cabin and a main wheel well of the aircraft. The curved web portion 222 is disconnected from the rear spar by the seal 510 and seal depressor 520 to decouple wing induced deflection. The seal 510 maintains the pressure barrier and is easily accessible and replaceable. A seal depressor bracket 522 is also disposed at the intersection of the curved web portion 222, rear spar, and side fitting 254 to help reduce deflection. The seal depressor 520 and seal depressor bracket 522 may include a sliding joint to avoid picking up wing forced deflections. Though the side fitting 254 is shown as a two-piece split side fitting, it will be appreciated that the seal assemblies described herein may also apply to one-piece side fittings.

Figure 6:
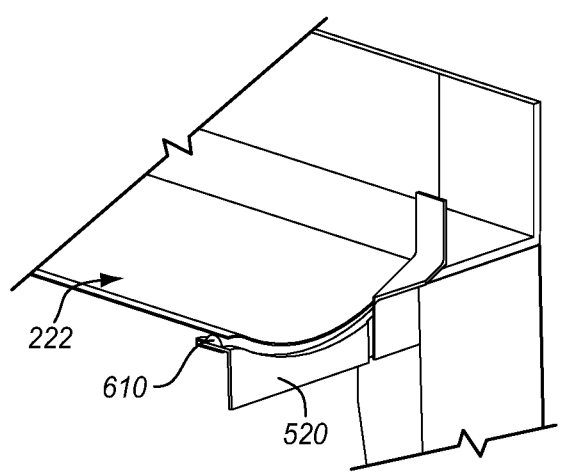
FIG. 6 is a close-up perspective view of a seal cross-sectioned along the A-A arrows of FIG. 5 in an illustrative embodiment.
Figure 7:
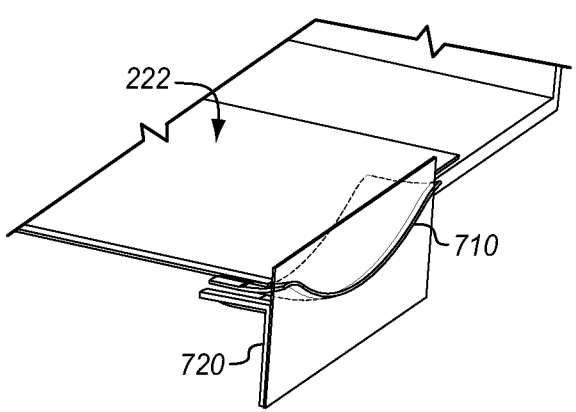
FIG. 7 is a close-up perspective view of a seal cross-sectioned along the A-A arrows of FIG. 5 in another illustrative embodiment.

FIG. 6 is a close-up perspective view of a seal 610 cross-sectioned along the A-A arrows of FIG. 5 in an illustrative embodiment. In this embodiment, the seal 610 comprises a P-type seal which may be snapped on the seal depressor 520 underneath a forward edge of the curved web portion 222. FIG. 7 is a close-up perspective view of a seal 710 cross-sectioned along the A-A arrows of FIG. 5 in another illustrative embodiment. In this embodiment, the seal 710 comprises a blade-type seal along with a seal depressor 720 at the rear spar are to decouple wing induced deflection and induced loading. Accordingly, in addition to providing flexibility and compressibility to the pressure deck 200, the curved web portion 222 is configured to support pressure from the cabin above the pressure deck 200.

Figure 8:
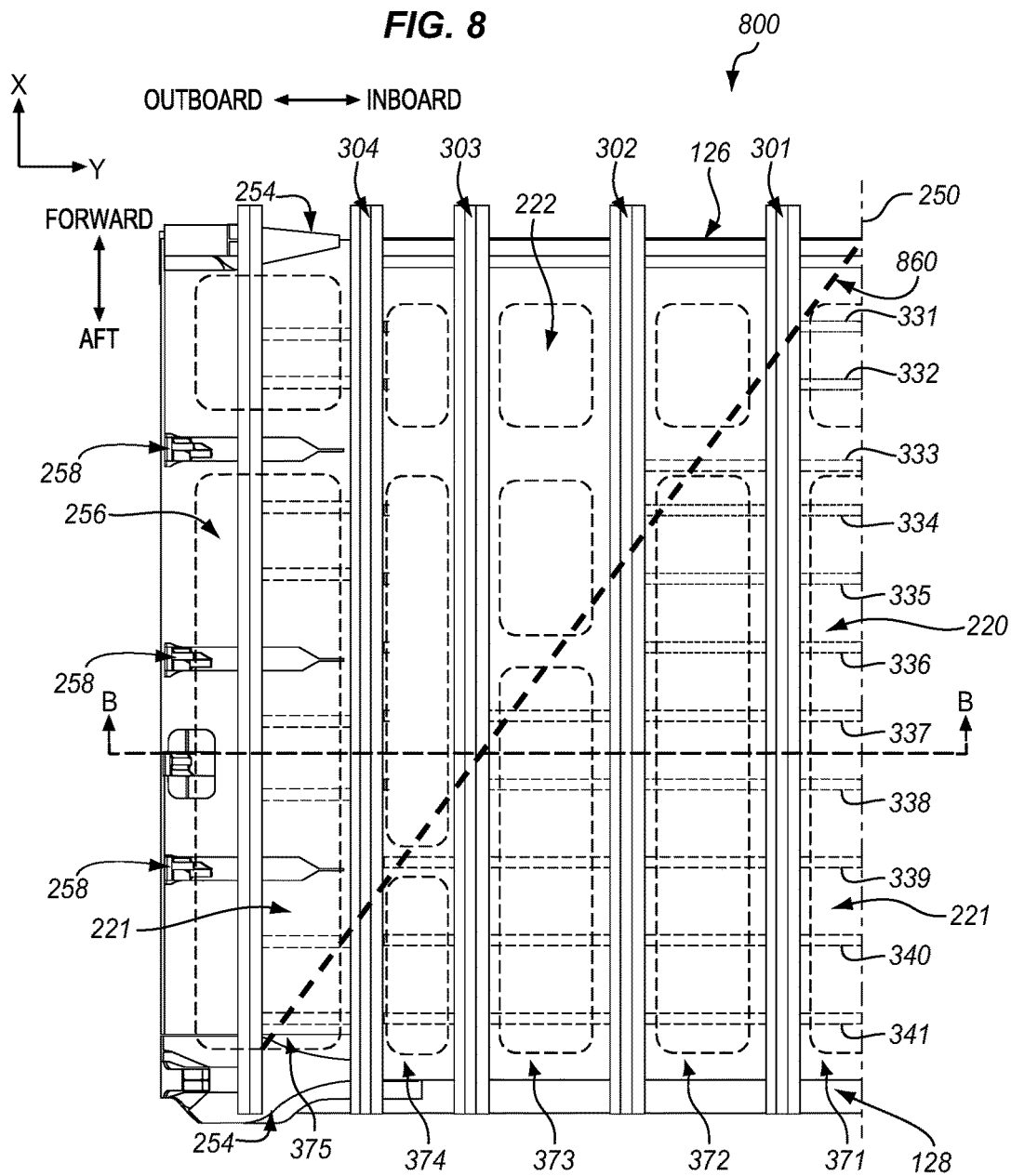
FIG. 8 is a top view of a pressure deck in another illustrative embodiment.
Figure 9:
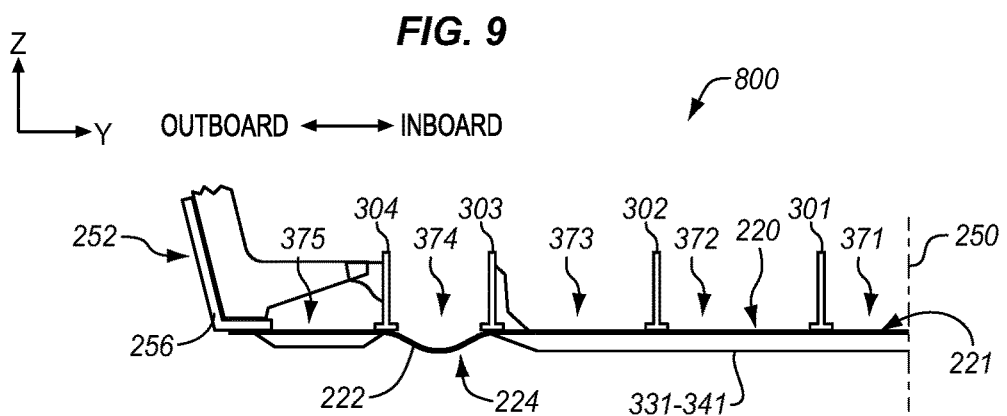
FIG. 9 is a horizontal view of the pressure deck cross-sectioned along the B-B arrows of FIG. 8 and viewed looking forward in another illustrative embodiment.

FIG. 8 is a top view of a pressure deck 800 in another illustrative embodiment. FIG. 9 is a horizontal view of the pressure deck 800 cross-sectioned along the B-B arrows of FIG. 8 and viewed looking forward in another illustrative embodiment. The pressure deck 800 of FIGS. 8-9 shares many elements, features, and advantages of the pressure deck 200 already described which may not be repeated for sake of brevity. In general, the pressure deck 800 similarly enables a desirable combination of lateral support and lateral flexibility with an alternate location of the flat web portion 221 and the curved web portion 222.

FIGS. 8-9 show a transition 860 between the flat web portion 221 and the curved web portion 222 that extends at least partially in the forward/aft direction. In this embodiment, the transition 860 extends diagonally with respect to the forward and aft direction such that a width (e.g., inboard/outboard width) of the flat web portion 221 is full along the aft wheel well bulkhead 128 and narrows toward a longitudinal center (e.g., center line 250) at the rear spar 126. The transition 860 may comprise a straight line between the rear spar 126 and aft wheel well bulkhead 128 representing approximate changeover from the flat web portion 221 to the curved web portion 222 rather than a literal outline of transition. Structure of the transition 860 may include an abrupt stepped fitting or a panel shaped with an arch at the forward end and a flat shape at the aft end. Accordingly, as viewed symmetrically from a top view showing left/right sides, the transition 860 forms a V-shape. Put another way, the flat web portion 221 may be roughly bounded by the transition 870 to form a triangle shape with a base of the triangle extending along the aft wheel well bulkhead 128 and an apex of the triangle at the rear spar 126. The base of the triangle is forward of the aft wheel well bulkhead 128 to provide effective local lateral loading. The location of the flat and catenary bays (i.e., angle of the V) can vary depending on the level and location of fixed and compliant structure.

Like that earlier described, the pressure deck 800 may include longitudinal beams 301-304 spaced from each other in an inboard and outboard direction between wheel well longeron beams 256 at either side of body of the aircraft to form a middle bay 371, intermediate bays 372-374, and outboard bays 375. In one embodiment, the flat web portion 221 is disposed in the middle bay 371 and the outboard bays 375 to react side/cargo loads, and a combination of the flat web portion 221 and the curved web portion 222 are disposed in the intermediate bays 372-374 to provide flexibility at an intersection of the rear spar 126 and the pressure deck 800. In particular, as best shown in FIG. 8, a length of the second bay 372 may include substantially more of the flat web portion 221 than the curved web portion 222, a length of the third bay 373 may include approximately similar amounts of the flat web portion 221 and the curved web portion 222, and a length of the fourth bay 374 may include substantially less of the flat web portion 221 than the curved web portion 222. The pressure deck 800 is thus advantageously compliant at the rear spar 126 via the curved web portion 222 while also providing a lateral load path and stiffness towards the aft wheel well bulkhead 128 via the flat web portion 221.

Also similar to that previously described, the flat web portion 221 is supported by transverse stiffeners 331-334. The flat web portion 221 is thus configured to minimize load concentration at the aft wheel well bulkhead 128 to reduce weight of the aft wheel well bulkhead 128 and thus the aircraft. Additionally, the flat web portion 221 provides lateral load path without the use of intercostals for stabilization, thus increasing systems integration space. The curved web portion 222 also provides similar benefits previously described. As shown in FIG. 9, each of the arches 224 of the curved web portion 222 extend between adjacent longitudinal beams (e.g., in intermediate bays 372-374, and in the fourth bay 374 in FIG. 9) to allow the pressure deck 800 to flex laterally. Thus, in this configuration, the flat web portion 221 is configured to provide a lateral load path proximate to the aft wheel well bulkhead 128, and the curved web portion 222 is configured to provide flexibility in the pressure deck 800 at an area adjacent to the rear spar 126. The benefit is a structurally optimized and compliant pressure deck configuration that allows the pressure deck 800 to flex with the wing at the rear spar 126 while providing a lateral load path for aircraft loads.

Although specific embodiments were described herein, the scope is not limited to those specific embodiments. Rather, the scope is defined by the following claims and any equivalents thereof

What is claimed is:

1. A pressure deck disposed over a main gear wheel well of an aircraft, the pressure deck comprising:
   longitudinal beams extending in a forward and aft direction between an aft wheel well bulkhead and a rear spar of the aircraft a web attached to an underside of the longitudinal beams, the web including a flat web portion supported by transverse stiffeners extending in an inboard and outboard direction, and a curved web portion including arches configured to flex laterally from load in the inboard and outboard direction,
   wherein a transition between a flat web portion and a curved web portion extends substantially diagonally with respect to the forward and aft direction such that a width of the flat web portion is full along the aft wheel well bulkhead and narrows toward a longitudinal center at the rear spar.

2. The pressure deck of claim 1 wherein:
   the flat web portion is configured to provide a lateral load path proximate to the aft wheel well bulkhead, and
   the curved web portion is configured to provide flexibility in the pressure deck at an area adjacent to the rear spar.

3. The pressure deck of claim 1 wherein:
   the longitudinal beams are spaced from each other in an inboard and outboard direction between wheel well longeron beams at either side of body of the aircraft to form a middle bay, intermediate bays, and outboard bays,
   the flat web portion is disposed in the middle bay and the outboard bays, and
   a combination of the flat web portion and the curved web portion are disposed in the intermediate bays.

4. The pressure deck of claim 1 wherein:
   the transverse stiffeners are disposed underneath the flat web portion.

5. The pressure deck of claim 1 wherein:
the flat web portion is co-cured with the transverse stiffeners.

6. A pressure deck disposed over a main gear wheel well of an aircraft, the pressure deck comprising:
longitudinal beams extending in a forward and aft direction between an aft wheel well bulkhead and a rear spar of the aircraft, the longitudinal beams spaced from each other in an inboard and outboard direction between wheel well longeron beams at either side of body of the aircraft to form a middle bay, intermediate bays, and outboard bays; and
a web attached to an underside of the longitudinal beams and the wheel well longeron beams, the web including a flat web portion supported by transverse stiffeners extending an inboard and outboard direction, and a curved web portion including arches configured to flex laterally under load in the inboard and outboard direction,
wherein a transition between the flat web portion and the curved web portion extends partially in the forward and aft direction of the aircraft,
wherein the flat web portion is disposed in the middle bay and the outboard bays to react side loads,
a width of the flat web portion is full along the aft wheel well bulkhead and narrows toward a longitudinal center at the rear spar, and
wherein a combination of the flat web portion and the curved web portion is disposed in the intermediate bays to provide flexibility at an intersection of the rear spar and the pressure deck.

7. The pressure deck of claim 6 wherein:
each of the arches extend between adjacent ones of the longitudinal beams to allow the pressure deck to flex laterally.

8. The pressure deck of claim 6 wherein:
the transverse stiffeners are disposed underneath the flat web portion.

9. The pressure deck of claim 6 wherein:
the flat web portion is co-cured with the transverse stiffeners.

10. The pressure deck of claim 1 wherein:
each of the arches extend between adjacent ones of the longitudinal beams to allow the pressure deck to flex laterally.

* * * * *